Aug. 19, 1930.  H. C. WAITE  1,773,290
CARBURETOR
Filed Aug. 18, 1927  2 Sheets-Sheet 1
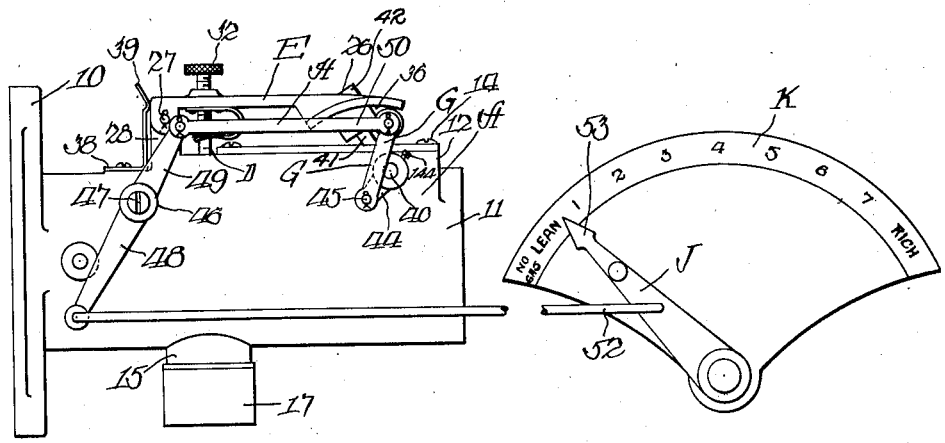
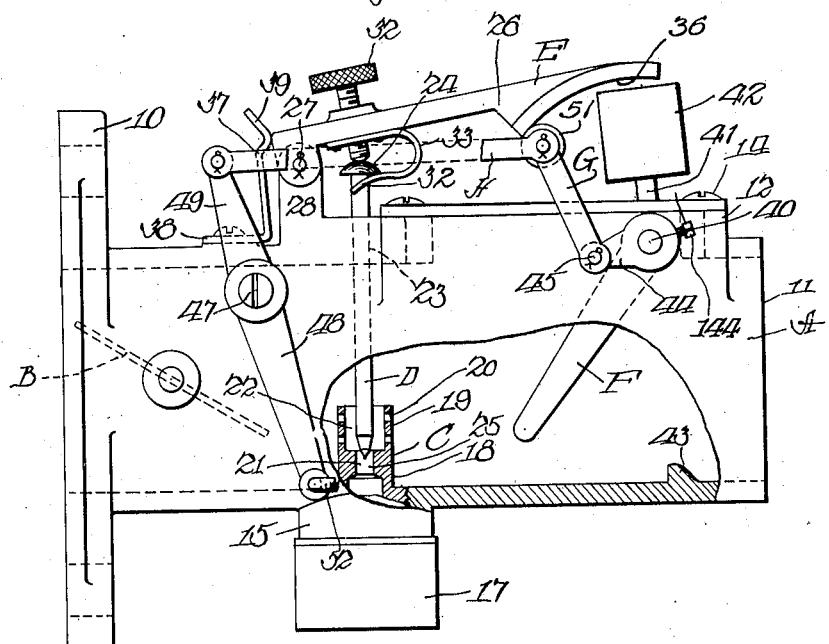
Inventor:
Harry C. Waite, Deceased,
By R. A. Dunann, Administrator.
By George I. Wright
His Atty.

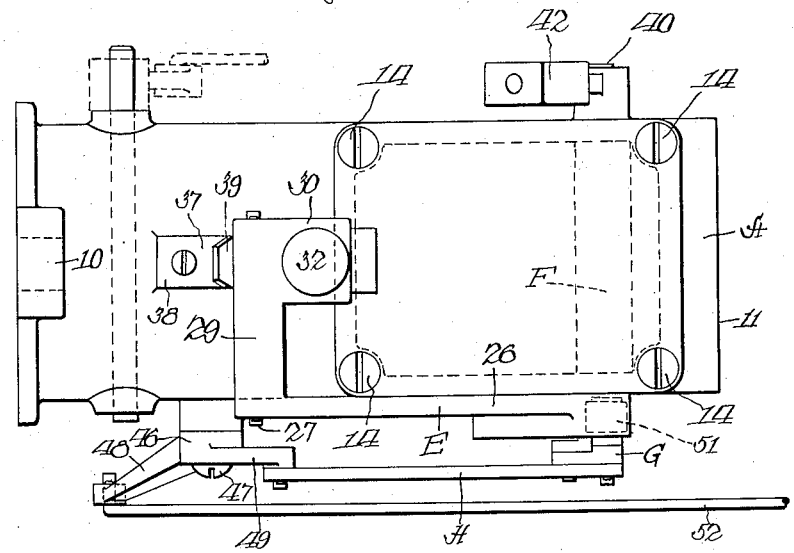
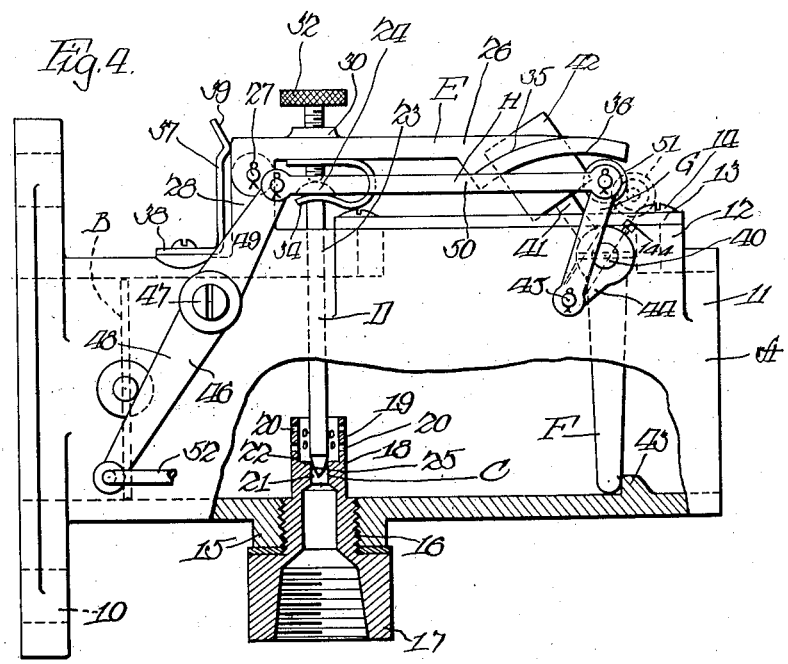

Patented Aug. 19, 1930

1,773,290

UNITED STATES PATENT OFFICE

HARRY C. WAITE, DECEASED, LATE OF OAKLAND, CALIFORNIA, BY R. A. DUNANN, ADMINISTRATOR, OF OAKLAND, CALIFORNIA

CARBURETOR

Application filed August 18, 1927. Serial No. 213,750.

This invention relates to improvements in carburetors.

In the operation of internal combustion engines and especially engines or motors of this type applied to motor vehicles, the problem of providing efficient means for supplying proper fuel mixture for all working conditions without waste of fuel has been found difficult of solution because of the wide variation in conditions under which the vehicle is operated. As is well known to those skilled in this art, a relatively rich mixture is required for priming the motor in starting, and also a relatively rich mixture is required when the motor is idling, whereas in order to economically operate the motor, a relatively lean mixture is necessary while the vehicle is under way on a level road. When climbing a hill a relatively rich mixture is again required. The amount of fuel required in the mixture for operating the motor economically also varies with atmospheric conditions, and will require a richer mixture for all operating conditions of the vehicle in cold than in warm weather. Other conditions are also encountered in the operation of motor vehicles where the mixture supplied must be either richer or leaner for all operating conditions depending upon the circumstances.

It is an object of the invention to provide a carburetor which shall meet all of the conditions set forth efficiently without waste of fuel.

Another object of the invention is to provide a carburetor for internal combustion motors through which air is drawn by suction of the motor and fuel is supplied to the air to produce the explosive mixture, wherein the amount of fuel supplied to the mixture is automatically controlled in accordance with the amount of air admitted under different working conditions, and wherein the amount of fuel supplied to the mixture is in addition variably controlled by the operator for any working conditions to either increase or decrease the amount of fuel supplied to the mixture to meet service conditions and effect efficient operation of the motor in the most economical manner.

A further object of the invention is to provide a carburetor for internal combustion motors, including a mixing chamber communicating with the intake of the motor, the mixing chamber having a throttle for controlling the admission of air, and a fuel nozzle communicating with the interior of the chamber, wherein the admission of the amount of fuel into the chamber is determined by a metering means controlled by means operated by the air drawn into the mixing chamber, and wherein the proportions of the fuel and the air mixture are at all times during the operation of the motor directly under the control of the operator of the vehicle by adjustment of the operating means of the metering means while operation of the metering means is in addition controlled by the air drawn into the mixing chamber.

A more specific object of the invention is to provide a carburetor including a mixing chamber having communication with the intake of an internal combustion motor and throttle means for controlling the admission of air, a fuel nozzle communicating with the mixing chamber, a metering pin co-operating with the nozzle, an air vane in the path of the air entering the mixing chamber, means controlled by the air vane to determine the amount of fuel admitted by said metering pin in accordance with the air flowing through the chamber, and means for adjusting the controlling means while subject to the operation of the air vane to vary the proportion of the fuel mixture as desired by the operator.

A still further object of the invention is to provide a carburetor including a mixing chamber having communication with the intake of an internal combustion motor and also having an air inlet, a fuel nozzle communicating with the mixing chamber, a metering pin co-operating with the nozzle, an air vane in the path of the air entering the mixing chamber, a lever for controlling the movement of the metering pin, fulcrum means operatively connecting the lever to the air vane to effect movement of the lever as the air vane is displaced by the air current, and manually operated controlling means for altering the effective fulcrum point of said fulcrum means to vary the throw of the lever and thereby control the movement of the metering pin to provide either a leaner or a richer mixture in accordance with the service requirements.

Yet another object of the invention is to provide a carburetor of the type specified, wherein the operation of the metering pin is controlled by an air vane, manually operated means for adjusting the controlling means without disturbing the operative relation of the air vane and the metering pin to prevent opening movement of the metering pin when the throttle valve is partially closed, thereby preventing fuel from entering the motor when the motor is employed as a brake in descending hills.

Another object of the invention is to provide a carburetor of the character indicated, including a mixing chamber having throttle controlled means for the air being admitted and an outlet communicating with the motor, a fuel nozzle associated with the mixing chamber through which the fuel is fed, a metering pin for closing said nozzle, an air vane in the path of the air entering the chamber, the vane having an operating connection with said metering pin to operate the same to effect opening of the nozzle, and manually controlled means for adjusting the operating connection to a position to effect a wide opening movement of the metering pin when the motor is started to prime the motor.

A further object of the invention is to provide a carburetor of the character indicated, ber of the character indicated, having a suction operated air vane therein for controlling a metering pin co-operating with a fuel nozzle, wherein the metering pin is provided with a conical point having a taper of varying degree to effect an initial slow opening of the nozzle and a final rapid opening thereof.

Other objects and advantages of the invention will more fully and clearly appear from the description and claims hereinafter following.

In the drawings, forming a part of this specification, Figure 1 is a side elevational view of a carburetor illustrating my improvements in connection therewith, and also showing the means for manually controlling the feed of fuel. Figure 2 is a side elevational view on an enlarged scale of the carburetor proper illustrated in Figure 1, the casing of the carburetor being partly broken away, showing certain parts in section. Figure 3 is a top plan view of the device illustrated in Figure 2, showing the parts in somewhat different position. And Figure 4 is a view similar to Figure 2, but illustrating the parts of the mechanism in a different position.

The improved carburetor as shown in the drawings, comprises broadly a hollow casing A having a throttle valve B of well known form at one end thereof, a fuel nozzle C, a metering pin D; a metering pin operating lever E; an air vane F; a fulcrum link G; a fulcrum link operating mechanism H; and a control lever J having a pointer thereon co-operating with an indicator dial K.

The casing A is in the form of a substantially tubular casting having a flange 10 at one end thereof adapted to be connected to the intake manifold of an internal combustion motor. An inlet opening 11 is provided at the end of the casing A opposite the flange section 10. At the end adjacent the opening 11, the upper portion of the casing A is enlarged as indicated at 12 to accommodate the upper end portion of the air vane F. The top of the enlarged portion 12 of the casing A is preferably closed by a cover plate 13 to permit access to the casing so that the parts may be readily assembled and adjusted. The cover plate 13 as shown is held in position by screws 14. At the bottom, the casing A is provided with an outwardly projecting boss 15 internally screw-threaded as indicated at 16 to receive the pipe fitting 17, which communicates with the supply pipe leading from the usual gasoline tank or vacuum tank. The fitting 17 extends through the bottom wall of the casing A and has a reduced portion 18 projecting into the hollow portion of the casing proper. The section 18 is provided with an upstanding cylindrical flange 19 perforated as indicated at 20 to permit vaporization of the fuel admitted through the nozzle C. The section 18 is provided with a central bore 21 for establishing communication between the interior of the fitting 17 and the interior of the casing A. The bore 21 is slightly enlarged at the upper end thereof as indicated at 22, thereby providing a conical valve seat.

The metering pin D which co-operates with the nozzle C is slidably mounted in a vertical bore 23 provided in the top wall of the casing A. The upper end of the metering pin D is headed, as indicated at 24, for a purpose hereinafter described. The bottom end of the pin D co-operates with the valve seat 22 of the fuel nozzle C, the extremity of the pin D being preferably of conical form to co-operate with the valve seat 22. As herein shown, the conical point of the metering pin is provided with a taper of varying degree, the lower extremity of the pin indicated by 25 being less keenly tapered than the conical section directly above the same. It will be evident that by this arrangement, when the metering pin D is raised, a relatively slow opening of the nozzle is initially obtained which is followed by a more rapid opening of the same to provide for richer fuel mixtures when the vehicle is operating under full power as when ascending grades.

The metering pin D is operated by means of the lever E which comprises a relatively long arm 26 pivoted at one end as indicated at 27 to an upstanding lug 28 on the top of the casing A. The lever arm 26 is provided with a lateral inward extension 29 overhanging the main body portion of the casing A and having a short arm 30 disposed parallel to the arm 26. The arm 30 is screw threaded as indicated to receive an adjusting thumb screw 32 adapted to engage with the head 24 of the metering pin D. A U-shaped leaf spring 33 is fixed to the bottom face of the arm 30 and has the free arm 34 thereof engaging underneath the head 24 of the metering pin, the arm 34 being slotted to accommodate the shank of the pin. At the free end, the arm 26 is slightly enlarged as indicated at 35 and has a curved bearing surface 36 on the underneath side thereof which co-operates with the fulcrum link G as hereinafter more clearly pointed out. In order to yieldingly maintain the lever 26 in the position shown in Figure 4, any suitable means may be provided, although the weight of the lever is in many cases sufficient to return the lever to its normal position. As shown in the drawings, I preferably employ a leaf spring 37 having a right angle section 38 fixed to the casing A and a vertically upstanding arm having an offset portion 39 bearing on the inner end of the lever arm 26 above the pivot point thereof. As clearly shown in Figure 4, the engagement of the U-shaped spring 33 with the cover plate 13 of the casing A limits the downward movement of the lever 26.

Inasmuch as the metering pin D is yieldingly connected to the operating lever E by the U-shaped spring 33, the pin is compelled to move upwardly and downwardly substantially in unison with the lever, thereby effecting opening and closing of the fuel nozzle C.

The air vane F is in the form of a substantially flat plate having trunnions 40 at the upper end thereof journaled in bearings in the side walls of the casing A. The air vane F is of a size to fit loosely within the interior of the casing A, allowing sufficient space when closed to permit slight leakage of air between the vane and the casing walls. At one side of the casing A, the corresponding trunnion 40 of the air vane F is provided with a lever arm 41 suitably secured thereto and carrying a weight member 42 thereon. The weight 42 is so arranged as to urge the vane F to closed position. In order to limit the movement of the air vane F when closed, the casing A is provided with an upstanding lug 43 on the bottom wall thereof engaging with the lower extremity of the vane F. The weight 42 is preferably adjustable on the arm 41 so that the forces applied in closing the air vane F may be varied to suit conditions. The trunnion 40 at the opposite side of the casing A projects outwardly beyond the casing as clearly shown in Figure 3. A short operating lever 44 is adjustably secured to the last named trunnion by a set screw 144 as clearly shown in Figures 2, 3 and 4 and has the fulcrum link G pivoted thereto as indicated at 45. The link G has the upper end thereof connected to the operating mechanism H.

The operating mechanism H comprises a lever 46 pivoted on a pin 47 mounted on the side wall of the casing A. The lever 46 has oppositely extending arms 48 and 49. The arm 49 has the free end thereof connected to the fulcrum link G by means of a connecting rod 50, the opposite ends of the rod 50 being secured to the lever 49 and link G respectively by pivot pins. The end section of the connecting rod 50 is rounded as indicated at 51 to provide a cylindrical head adapted to co-operate with the curved bearing surface 36 on the metering pin operating lever E. The free end of the arm 48 of the lever is pivotally connected to an operating rod 52 connected to the control lever J.

The control lever J is preferably mounted on the instrument board of the motor vehicle and has a pointed end section 53 operating as an indicator which co-operates with the dial K.

As most clearly shown in Figure 1, the dial is provided with proper indicating characters by which the adjustment of the lever J may be accurately determined. As shown in Figure 1, the dial bears the legend "Lean" at one end thereof and "Rich" at the other end and has a series of numbers between the words "Lean" and "Rich."

The improved carburetor may be employed with equal facility in connection with systems wherein the fuel is fed by gravity to the fuel nozzle of the carburetor or wherein the fuel is drawn by suction through the nozzle from a tank at a lower level than the carburetor. It is also feasible to employ my improvements in connection with a carburetor having the usual float feed chamber associated therewith.

In the operation of this improved carburetor, the throttle valve is controlled in the usual manner. It will be evident that as the throttle valve is opened, more air will be admitted to the carburetor through the intake opening 11, thereby displacing the air vane F inwardly as the current of air increases. As the vane F is swung to the left, as viewed in Figure 4, the fulcrum link operating mechanism H being maintained in the position shown, the connecting link G will swing the rod 50 upwardly until the enlargement 51 engages with the bearing surface 36 on the under side of the lever E. As the air vane F is swung further to the left, the lever E will be lifted, swinging about the pivot 27, thereby raising the metering pin D and opening the fuel nozzle C. The proper amount of fuel will thus be admitted through the nozzle C to provide the most efficient mixture for operating the motor. As more air is admitted by means of the throttle valve B, the air vane F will be still further displaced, thereby raising the lever to a greater extent and further opening the metering pin D and admitting more fuel through the nozzle C so as to provide a richer mixture. When starting the motor, it is highly desirable to provide a rich priming mixture. In order to obtain this result, the controlling lever J is thrown to the right as viewed in Figure 1 and may be moved to the extreme position beyond the figure "7" shown on the dial until the pointer 53 registers with the word "rich". In this position of the controlling lever J, the connecting rod H is pulled to the extreme right as shown in Figure 1, thereby throwing the upper lever arm 49 of the lever 46 to its extreme left position and moving the upper end of the fulcruming link G to its extreme left position. It will be evident that by thus altering the position of the link G, the enlargement 51 will be so positioned as to apply the fulcrum point to the lever E at a point some distance inwardly from the free end thereof, thereby increasing the throw of the lever E when the vane F is operated, which results in a greater movement of the metering pin D and a larger opening of the fuel nozzle C. It will be evident that when the parts are positioned as described, a slight movement of the vane F will open the nozzle C to a sufficient extent to prime the motor with a rich mixture for starting. When the motor has been started, and the vehicle is under way, it is desirable to provide a relatively lean mixture for level road operation and in order to obtain this result, the operating lever J is moved to the left hand position indicated by the word "Lean" on the dial K shown in Figure 1. When exceptionally steep grades are encountered, it is desirable to provide a richer mixture for hill climbing and the lever J may be moved to the desired point to the right of the position shown in Figure 1 to provide the proper proportions of fuel and air for the mixture.

By providing the adjustable fulcrum connection between the air vane F and the operating lever E for the metering pin, the proportions of fuel and air may be varied as desired by shifting the lever J and consequently the link G, without interfering with the automatic control of the metering pin D by the air vane F. In other words, the proper amount of fuel is fed for the various throttle operations in operating the vehicle under all service conditions. This improved carburetor may be readily adjusted for these conditions by setting the lever J at the proper position with reference to the dial K. It is also well known that relatively richer mixtures are necessary in cold than in warm weather and in order to provide a uniformly richer mixture for all operating conditions, the lever J is adjusted to the right as shown in Figure 1 to a point depending upon the richness of the mixture desired. When the improved carburetor is employed in connection with gravity fed systems for the fuel, there is no danger of the metering pin being accidentally opened by adjustment of the lever J when the motor is not in operation. Upon reference to Figures 1, 3 and 4, it will be evident that the link G when swung from the extreme right hand position to the extreme left hand position, there will be no operation of the lever E, unless the vane F is also moved. As shown in Figure 4, the link G is of such a length that the enlargement 51 of the rod 50 is slightly spaced from the bearing surface 36 of the lever E when the air vane F is in the vertical position. Furthermore, with the air vane in this position, the bearing surface 36 is concentric with the pivot point 45 of the link G. Due to this arrangement, the enlargement 51 will be spaced the same distance from the bearing surface 36 for all positions of the link G with the vane F closed. In order to bring the enlargement 51 into engagement with the surface 36 and operate the lever E, the vane F must be swung an appreciable distance to the left. This idle movement of the operating fulcrum link G assures proper seating of the metering pin D so that there will be no leakage of fuel from the nozzle C during the time that the motor is inactive.

When the vehicle is descending a hill, it is at times desirable to use the motor as a brake to retard movement of the vehicle. In so employing the motor, the throttle valve is substantially closed, thereby cutting off the suction of the motor. In the ordinary form of carburetor, the air current passing the throttle valve under these conditions is sufficient to withdraw a certain amount of fuel from the fuel nozzle, which is not only wasteful, but is also detrimental in that the raw gasoline which is condensed in the cylinders runs down into the crank case of the motor and dilutes the lubricating oil. The braking effect just described may be obtained with this improved carburetor without the danger of diluting the lubricating oil in the crank case of the motor, and the resultant waste of fuel, because adjustment of the operating lever J to the left to the position designated "No gas" on the dial K will throw the upper end of the lever 46 to the right as shown in Figure 4 to such an extent as to displace the enlargement 51 beyond the vertical plane of the vane F and outwardly beyond the free end of the lever E to the dotted line position in said figure, thus in effect disconnecting the vane F from the lever E, with the result that the lever E will not be operated when the vane F is swung to the left as shown in Figure 4.

In Figure 2, the adjustment of the link

G is shown for a relatively rich mixture, thereby effecting a greater opening of the metering pin D, for the same displacement of the air vane F, than is the case with the adjustment of the link G as shown in Figure 4. Although as hereinbefore pointed out a metering pin having a point provided with two degrees of taper is employed, the invention is not limited to this construction and a metering pin having an ordinary tapered point may be employed, it being evident that the tapered point will effect increased opening of the gasoline nozzle as the metering pin is raised. With the metering pin having the extreme point tapered to a greater degree than the conical section immediately adjacent thereto, a more rapid rate of fuel feed for the same movement of the metering pin is obtained during the latter part of the lifting of the same than during the initial movement thereof, thus providing a richer mixture at wider throttle openings than is the case with the metering pin having a point of uniform conical section.

From the preceding description taken in connection with the drawings, it will be evident that a carburetor of great simplicity of construction and economical operation with a result saving of fuel is provided. The carburetor has been further simplified over prior constructions by omission of the usual choke valve and float chamber.

While it is herein shown and described what is now considered the preferred manner of carrying out this invention, the same is merely illustrative, and contemplates all changes and modifications that come within the scope of the claims appended hereto.

What is claimed is:

1. In a carburetor, the combination with a mixing chamber having communication with the intake of a motor and having an air inlet, of a fuel nozzle communicating with the mixing chamber, a metering element cooperating with said nozzle and adapted to open and close the same, means controlled by the air entering the carburetor for operating said metering element, said means including a lever for actuating the metering element, a link having adjustable engagement with said lever for actuating said lever, and an adjustable fulcrum for said link operated by said air controlled means, the range of adjustments of said link including one in which said link is thrown out of engaging relation with said lever for the purpose of permitting idle actuation of the adjustable fulcrum by said air controlled means without imparting opening movements to the metering element.

2. In a carburetor, the combination with a mixing chamber having communication with the intake of a motor and having an air inlet and an outlet for communicating with the intake of the motor, of a fuel nozzle communicating with the mixing chamber, a metering pin cooperating with said nozzle, a swinging air vane in the path of the incoming air, said vane being mounted upon trunnions, a lever pivoted at one end and having an intermediate connection with the metering pin for raising and lowering the same, a lever arm rigid one of the trunnions of the air vane, a link pivoted to said lever arm and adapted to be raised and lowered therewith and having its opposite end normally in engaging relation with the lever for the metering pin, and manually controlled means for swinging said link to vary its point of engagement with the metering pin lever for varying the throw of the lever occasioned by a swinging of the air vane.

3. In a carburetor, the combination with a mixing chamber having communication with the intake of a motor and having an air inlet and an outlet for communicating with the intake of the motor, of a fuel nozzle communicating with the mixing chamber, a metering pin cooperating with said nozzle, a swinging air vane in the path of the incoming air, said vane being mounted upon trunnions, a lever pivoted at one end and having an intermediate connection with the metering pin for raising and lowering the same, a lever arm rigid with one of the trunnions of the air vane, a link pivoted to said lever arm and adapted to be raised and lowered therewith and having its opposite end normally in engaging relation with the lever for the metering pin, and manually controlled means for swinging said link to vary its point of engagement with the metering pin lever for varying the throw of the lever occasioned by a swinging of the air vane, said range of adjustments including one in which the link is thrown out of coacting relation with the metering pin lever.

In witness that I claim the foregoing I have hereunto subscribed my name this 29th day of June, 1927.

R. A. DUNANN.
*Administrator of the Estate of Harry C. Waite, Deceased.*